E. H. ANGLE.
ORTHODONTIC APPLIANCE.
APPLICATION FILED MAY 19, 1914.
1,204,113.
Patented Nov. 7, 1916.
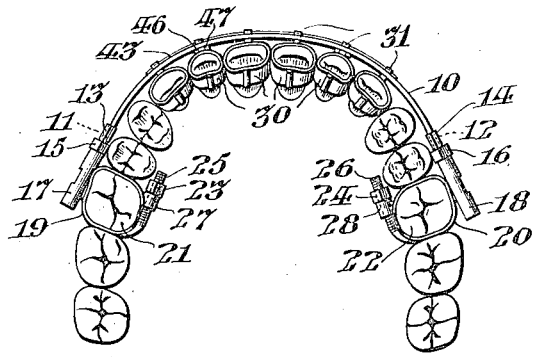
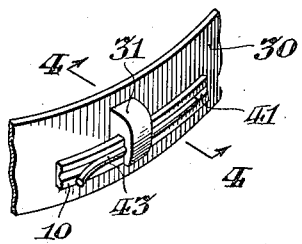
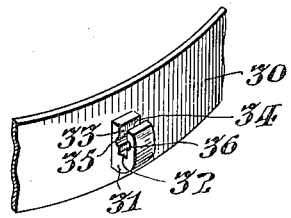
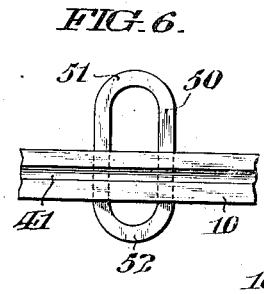
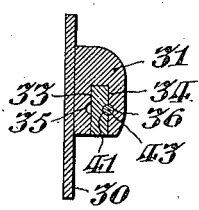
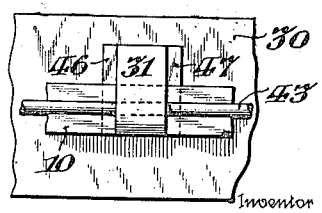
EDWARD H. ANGLE,

UNITED STATES PATENT OFFICE.

EDWARD H. ANGLE, OF NEW LONDON, CONNECTICUT.

ORTHODONTIC APPLIANCE.

1,204,113.   Specification of Letters Patent.   Patented Nov. 7, 1916.

Application filed May 19, 1914. Serial No. 839,541.

*To all whom it may concern:*

Be it known that I, EDWARD H. ANGLE, a citizen of the United States, and a resident of New London, in the county of New London, State of Connecticut, have invented certain new and useful Improvements in Orthodontic Appliances, of which the following is a specification, reference being had to the accompanying drawings.

My invention relates to the art of regulation of the teeth, and is directed particularly to that class of devices in which an arch-bar is adjustably supported at its respectively opposite ends, and detachably connected intermediate of its ends with selected teeth of the dental arch.

The principal objects of my invention are, to provide simple, efficient and highly effective means for detachably engaging the arch-bar with selected teeth of the dental arch, without disturbing the adjustment of the ends of said arch-bar with respect to its supporting anchorages; and to provide means for rigidly securing said arch-bar with the tooth-engaging means in such manner that the tooth thus engaged may be contemporaneously rotated by said arch-bar upon any selected axis, and bodily shifted in any desired direction.

Other objects of my invention are, to provide the arch-bar with abutments to prevent its longitudinal movement with respect to the tooth-engaging means, and to so form said abutments that they may be readily secured on the arch-bar in absolutely uniform spaced relation.

My invention comprehends a tooth-band having a slotted projection provided with a groove in the walls of the slot to form a hook, and a flexible arch-bar of such cross-section as may be snugly fitted within the slot in said projection by a lateral movement thereof, and having a groove so disposed as to register with the groove in the projection, and complementary therewith to provide a keyway for the reception of a suitable key or spline.

My invention further includes all of the various novel features of construction and arrangement hereinafter more definitely specified.

In the accompanying drawings, Figure 1 is an inverted plan view of the upper human dental arch, showing a convenient embodiment of my invention attached to selected teeth thereof; Fig. 2 is a fragmentary perspective view of a tooth-attaching band operatively engaged with the arch-bar; Fig. 3 is a fragmentary view of said tooth-band, inverted, the arch-bar being removed for convenience of illustration; Fig. 4 is a transverse vertical sectional view taken on the line 4—4 in Fig. 2; Fig. 5 is a fragmentary plan view showing the abutments on the arch-bar for preventing its longitudinal movement with respect to the tooth-band; Fig. 6 is a fragmentary front elevational view of the arch-bar, showing a convenient method of applying the abutments thereto; Fig. 7 is a fragmentary front elevational view of the arch-bar, showing the abutments thus attached; and Fig. 8 is a perspective view of a convenient form of key.

The tooth-regulating appliance to which this invention is especially applicable is indicated in a general way in Fig. 1, and includes an arch-bar consisting of a resilient middle section 10 fitted in suitable sockets 11 and 12 in the externally threaded end sections 13 and 14, which respectively pass through nuts 15 and 16 loosely carried by the anchor tubes 17 and 18 of the respective anchor bands 19 and 20, as shown in detail in a prior Patent, No. 1,014,030, granted to me January 9, 1912.

As shown in Fig. 1, the anchor bands 19 and 20 are respectively secured to the first molars 21 and 22 upon opposite sides of the dental arch by the adjusting nuts 23 and 24 rotatably mounted on the threaded stems 25 and 26 respectively projecting from one end of the respective anchor bands 19 and 20, and extending through eyes 27 and 28 respectively carried by the opposite ends of the respective anchor bands.

My improvement resides in the means for detachably securing any malposed teeth of the dental arch to the arch-bar, and may be best formed of a strip of sheet material, preferably of non-corrosive metal, which may be bent to form a band 30 to embrace selected teeth of the dental arch, as shown in Fig. 1.

The tooth-band 30, as best shown in Figs. 2, 3 and 4, may be provided with an external projection 31 having an open sided slot 32, such as may be formed by a saw-cut of suitable width extending inwardly from one wall thereof, preferably in the wall toward the incisive edge of the teeth to form a hook for the reception of the middle arch section 10 of the arch-bar, which is preferably of rectangular cross-section and of a breadth greater than its thickness, as best shown in Fig. 4.

The opposed walls 33 and 34 of the slot 32 extend substantially in a plane with that portion of the tooth-band from which the projection or hook protrudes, and said walls are provided with grooves 35 and 36 of any desired form, preferably semi-cylindrical, and extend longitudinally with the general direction of the slot 32.

The arch-bar 10 is provided in one or both of its broader sides with the groove 41 extending longitudinally thereof, and complementary to the groove 35 or 36 to form a keyway, into which a wire 43, such as shown in Figs. 1 and 2, or a key 45, such as shown in Fig. 8, may be inserted to detachably secure said arch-bar 10 in the slot in the projection 31, in such rigid relation that when twisted or otherwise forced in any direction, the tooth-band and the tooth to which it may be attached will respond correspondingly.

Although the arch-bar 10 is shown as being rectangular in cross-section, and fitted in a slot of similar contour to prevent its rotation in said slot, it is to be understood that other shapes may be as readily employed, so long as the arch-bar is fitted to the slot in such a manner as to tend to effect the desired twisting action of the malposed teeth toward their normal alinement in the dental arch.

In order to prevent the longitudinal movement of the arch-bar in the slot, when force is exerted to shift the teeth in the direction of the dental arch, said arch-bar may be provided, as best shown in Figs. 5 and 7, with abutments 46 and 47, secured thereto and arranged to engage the opposite sides of the hook or projection 31.

The abutments 46 and 47 may be best secured to the arch-bar by soldering, and as such a soldering operation is extremely difficult, in view of the minuteness of the structure, I have found it best to provide said abutments initially in the form of an elongated link 50, as shown in Fig. 6, which may be conveniently held in place during the soldering operation, and when securely attached may have its semi-circular ends 51 and 52 removed in any suitable manner, thus leaving the parallel abutments 46 and 47 properly spaced apart, as shown in Fig. 7.

My invention is particularly advantageous in that the arch-bar may be attached to and removed from the malposed teeth of the dental arch without removing or even disturbing the adjusted relation between the arch-bar and its anchorages, it being only necessary to withdraw the key from the keyway to so release the arch-bar 10 that it may be removed from the slot by a slight lateral movement and similarly replaced; furthermore, by the employment of a tooth-band having such an attachment, the arch-bar may have its ends threaded and directly attached to the anchorages without the interposition of the separate parts embodied in what is commonly known as the "sectional arch."

I do not desire to limit my invention to the precise details of construction and arrangement as herein set forth, as various modifications may be made therein without departing from the essential features of my invention as defined in the appended claims.

Having thus described my invention, I claim:

1. An orthodontic appliance, comprising tooth-engaging means having a slot provided with a grooved wall, an arch-bar arranged to be snugly fitted in said slot and having a groove extending longitudinally thereof and in registry with the groove in the wall of said slot, and complementary therewith to form a keyway, and means extended through said keyway for rigidly connecting said arch-bar with said tooth-engaging means in detachable relation.

2. An orthodontic appliance, comprising tooth-engaging means provided with a projection having a grooved free member extending toward one edge thereof, between which and said tooth-engaging means is a recess in which an arch-bar may be retained.

3. An orthodontic appliance, comprising tooth-engaging means provided with a projection having a grooved free member extending toward one edge thereof and forming a recess, and an arch-bar detachably fitted in said recess and having a groove arranged to register with the groove in said free member.

4. An orthodontic appliance, comprising an arch forming bar arranged to be engaged with a tooth engaging member, and having a groove extending substantially from end to end in the side thereof, arranged to register with a groove in said member and adapted to receive a securing device.

5. An orthodontic appliance, comprising tooth-engaging means having a slot provided with a grooved wall, an arch-bar arranged to be snugly fitted in said slot and having a groove extending longitudinally thereof and in registry with the groove in the wall of said slot and complementary therewith to form a keyway, and abutments on said arch-bar arranged to engage said tooth-engaging means to prevent its longitudinal movement with respect thereto, and means extended through said keyway for rigidly connecting said arch-bar with said tooth-engaging means in detachable relation.

6. An orthodontic appliance, comprising tooth-engaging means having grooved walls, an arch-bar arranged to be snugly fitted between said walls, and having a groove extending longitudinally thereof and complementary with the grooves in said walls to form a keyway, and having means arranged to prevent its longitudinal movement with respect thereto, and means extended through said keyway for rigidly connecting said arch-bar, in detachable relation with said tooth-engaging means.

7. An orthodontic appliance, comprising tooth-engaging means provided with a hook having buccally and lingually disposed grooved surfaces forming abutments, an arch-bar arranged to be snugly fitted between said surfaces and having a groove extending longitudinally thereof and in registry with one of the grooves in said hook and complementary therewith to form a keyway, spaced abutments on said arch-bar for engaging said hook, and means extending through said keyway for rigidly connecting said arch-bar with said hook in detachable relation.

8. An orthodontic appliance, comprising tooth-engaging means having a hook providing lingual and buccal abutment surfaces provided with grooves, an arch-bar arranged to be snugly fitted in said hook between said surfaces and having a groove extending longitudinally thereof and complementary with one of the grooves in said hook to form a keyway, abutments on said arch-bar extending beyond the edge thereof and arranged to engage the sides of said hook and prevent its longitudinal movement with respect thereto, and a key extended through said keyway for preventing the accidental lateral displacement of said arch-bar from said hook.

9. An orthodontic appliance, comprising tooth-engaging means having a hook provided with lingual and buccal abutment surfaces having grooves, an arch-bar arranged to be snugly fitted in said hook between said surfaces and having a groove extending longitudinally thereof and complementary with one of the grooves in said hook to form a keyway, abutments on said arch-bar formed in the shape of an enlongated link having parallel side bars whose ends may be subsequently removed to provide separate spaced abutments, and a key extended through said keyway for preventing the accidental lateral displacement of said arch-bar from said hook.

10. An orthodontic appliance, comprising an arch-bar having spaced abutments secured thereto in the form of a link whose connecting ends may be subsequently severed.

In witness whereof, I have hereunto set my hand this 16th day of May, A. D., 1914.

EDWARD H. ANGLE.

Witnesses:
JAMES A. DAVIS,
WILLIAM BELCHER.